United States Patent
Kim et al.

(10) Patent No.: US 11,233,583 B2
(45) Date of Patent: Jan. 25, 2022

(54) HUMAN BODY COMMUNICATION DEVICE HAVING SINGLE ELECTRODE

(71) Applicant: ELECTRONICS AND TELECOMMUNICATIONS RESEARCH INSTITUTE, Daejeon (KR)

(72) Inventors: Sung Eun Kim, Daejeon (KR); Tae Wook Kang, Daejeon (KR); Hyuk Kim, Daejeon (KR); Kwang IL Oh, Daejeon (KR); Kyung Hwan Park, Daejeon (KR); Mi Jeong Park, Sejong (KR); Hyung-IL Park, Daejeon (KR); Kyung Jin Byun, Daejeon (KR); Jae-Jin Lee, Daejeon (KR); In Gi Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/020,400

(22) Filed: Sep. 14, 2020

(65) Prior Publication Data

US 2021/0126716 A1   Apr. 29, 2021

(30) Foreign Application Priority Data

Oct. 28, 2019 (KR) .................. 10-2019-0134661
Apr. 9, 2020 (KR) .................. 10-2020-0043156

(51) Int. Cl.
*H04B 13/00* (2006.01)
*H04W 52/02* (2009.01)

(52) U.S. Cl.
CPC ...... *H04B 13/005* (2013.01); *H04W 52/0251* (2013.01)

(58) Field of Classification Search
CPC ...... H04B 13/005; H04B 13/00; H04B 17/12; H04B 1/0075; H04B 1/1018; H04B 1/401;
(Continued)

(56) References Cited

U.S. PATENT DOCUMENTS 6,771,161 B1 *   8/2004   Doi .................. G07C 9/28
                                                340/5.64
8,054,159 B2    11/2011   Hyoung et al.
(Continued)

FOREIGN PATENT DOCUMENTS

KR   1020070061251 A     6/2007
KR      101147607 B1     5/2012
WO   WO-2010049842 A1 * 5/2010  ........... H04B 13/005

*Primary Examiner* — Lana N Le (57) ABSTRACT

A human body communication device includes an electrode, a matching circuit, a switch providing a first path electrically connected to the matching circuit and a second path electrically connected to the matching circuit, a sensor, in a first state, connected to the matching circuit through the switch, outputting a first sensing signal to the matching circuit, and outputting a second sensing signal when a difference between a signal generated from the matching circuit in response to the first sensing signal and the first sensing signal is greater than or equal to a threshold, a transmitter, in a second state, connected to the matching circuit through the switch, and outputting a data signal to the matching circuit, and a controller controlling the switch from the first state to the second state in response to receiving the second sensing signal from the sensor, in the first state.

13 Claims, 5 Drawing Sheets

(58) Field of Classification Search
CPC .......... H04B 1/44; H04B 5/0043; H04B 5/02;
H04B 5/0006; H04B 1/40; H04B 1/0458;
H04B 1/59; H04B 5/0062; H04B 5/0081;
H04B 7/0602; H04B 7/061; H04B
7/0802; H04B 7/0822; H04W 52/0251;
A61B 5/053; A61B 2560/0223; A61B
2562/0214; A61B 2562/04; A61B 18/082;
A61B 5/6801; H04M 1/72409; H04M
2250/12; H02J 50/00; H02J 13/00004;
H02J 3/14; H02J 50/20; H02J 50/40;
H02J 7/0063
See application file for complete search history.

(56) References Cited

U.S. PATENT DOCUMENTS

| | | | |
|---|---|---|---|
| 8,836,555 B2* | 9/2014 | Koyama | H01L 29/00 |
| | | | 341/122 |
| 9,490,885 B1* | 11/2016 | Zheng | H04W 52/42 |
| 2010/0234756 A1 | 9/2010 | Hyoung et al. | |
| 2011/0086595 A1* | 4/2011 | Shibata | H04B 13/005 |
| | | | 455/73 |
| 2011/0148652 A1 | 6/2011 | Kim et al. | |
| 2015/0148634 A1* | 5/2015 | Garudadri | A61B 5/14552 |
| | | | 600/323 |
| 2018/0351657 A1* | 12/2018 | Fukuda | H04B 1/1615 |
| 2019/0001139 A1* | 1/2019 | Mishra | A61N 1/36146 |
| 2019/0052371 A1* | 2/2019 | Uno | H04B 13/005 |
| 2019/0165870 A1* | 5/2019 | Uno | H04B 5/02 |
| 2019/0282822 A1* | 9/2019 | Freeman | A61B 5/6833 |
| 2019/0288737 A1* | 9/2019 | Hanks | H03F 1/56 |
| 2020/0021680 A1* | 1/2020 | Rouaissia | H04M 1/72454 |
| 2020/0110049 A1* | 4/2020 | Lee | G01N 33/02 |

* cited by examiner

HUMAN BODY COMMUNICATION DEVICE HAVING SINGLE ELECTRODE

CROSS-REFERENCE TO RELATED APPLICATIONS

This non-provisional patent application claims priority under 35 U.S.C. § 119 to Korean Patent Application No. 10-2019-0134661 filed on Oct. 28, 2019 and Korean Patent Application No. 10-2020-0043156 filed on Apr. 9, 2020, in the Korean Intellectual Property Office, the disclosures of which are incorporated by reference herein in their entireties.

BACKGROUND

Embodiments of the inventive concept described herein relate to an electronic device, and more particularly, relate to a human body communication device having a single electrode.

A human body communication device is a device that transmits or receives signals using a human body as a medium. The human body communication device may be configured to transmit or receive the signals through electrodes in contact with the human body. The human body communication device may be combined with a wearable device that maintains contact with the human body, thereby providing various new experiences to a user.

The fact that a plurality of electrodes of the human body communication device must maintain contact with the human body is one of the obstacles to commercialization of the human body communication device. Constraints in which a plurality of electrodes maintain contact with the human body may cause inconvenience to a user's daily life. Therefore, research is needed to reduce the number of electrodes in contact with the human body.

SUMMARY

Embodiments of the inventive concept provide a human body communication device that improves user convenience and reduces power consumption by having a single electrode.

According to an exemplary embodiment of the inventive concept, a human body communication device includes an electrode, a matching circuit connected to the electrode and that provides an impedance matching, a switch that provides a first path that is electrically connected to the matching circuit in a first state, and provides a second path that is electrically connected to the matching circuit in a second state, a sensor, in the first state, connected to the matching circuit through the first path of the switch, that outputs a first sensing signal to the matching circuit through the switch, and outputs a second sensing signal when a difference between a signal that is generated from the matching circuit in response to the first sensing signal and the first sensing signal is greater than or equal to a threshold, a transmitter, in the second state, connected to the matching circuit through the second path of the switch, and that outputs a data signal to the matching circuit through the switch, and a controller that controls the switch from the first state to the second state in response to receiving the second sensing signal from the sensor, in the first state.

According to an exemplary embodiment, the controller, in the first state, may be further configured to control the sensor in an active mode and control the transmitter in a power saving mode.

According to an exemplary embodiment, the controller, in the second state, may be further configured to control the sensor in a power saving mode and control the transmitter in an active mode.

According to an exemplary embodiment, the transmitter may be further configured to output the same data as the data signal in response to that the switch enters the second state from the first state.

According to an exemplary embodiment, the controller, in the second state, may be further configured to control the switch from the second state to the first state in response to that the transmitter completes an output of the data signal.

According to an exemplary embodiment of the inventive concept, a human body communication device includes an electrode, a matching circuit connected to the electrode and that provides an impedance matching, a switch that provides a first path that is electrically connected to the matching circuit in a first state, and provides a second path that is electrically connected to the matching circuit in a second state, a sensor, in the first state, connected to the matching circuit through the first path of the switch, that outputs a first sensing signal to the matching circuit through the switch, and outputs a second sensing signal when a difference between a signal that is generated from the matching circuit in response to the first sensing signal and the first sensing signal is greater than or equal to a threshold, a receiver, in the second state, connected to the matching circuit through the second path of the switch, and that receives a data signal from the matching circuit through the switch, and a controller that controls the switch from the first state to the second state in response to receiving the second sensing signal from the sensor, in the first state.

According to an exemplary embodiment, the controller, in the first state, may be further configured to control the sensor in an active mode and control the receiver in a power saving mode.

According to an exemplary embodiment, the controller, in the second state, may be further configured to control the sensor in a power saving mode and control the receiver in an active mode.

According to an exemplary embodiment, in the second state, when an idle time for which the data signal may be not received is longer than a threshold, the controller may be further configured to control the switch from the second state to the first state.

According to an exemplary embodiment of the inventive concept, a human body communication device includes an electrode, a matching circuit connected to the electrode and that provides an impedance matching, a switch that provides a first path that is electrically connected to the matching circuit in a first state, and provides a second path that is electrically connected to the matching circuit in a second state, a sensor, in the first state, connected to the matching circuit through the first path of the switch, that outputs a first sensing signal to the matching circuit through the switch, and that outputs a second sensing signal when a difference between a signal that is generated from the matching circuit in response to the first sensing signal and the first sensing signal is greater than or equal to a threshold, a transceiver, in the second state, connected to the matching circuit through the second path of the switch, and that outputs a first data signal to the matching circuit through the switch or receives a second data signal from the matching circuit, and a controller that controls the switch from the first state to the second state in response to receiving the second sensing signal from the sensor, in the first state.

According to an exemplary embodiment, the controller, in the first state, may be further configured to control the sensor in an active mode and control the transceiver in a power saving mode.

According to an exemplary embodiment, the controller, in the second state, may be further configured to control the sensor in a power saving mode and control the transceiver in an active mode.

According to an exemplary embodiment, in the second state, when an idle time for which the first data signal is not output and the second data signal is not received is longer than a threshold, the controller may be further configured to control the switch from the second state to the first state.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Hereinafter, embodiments of the inventive concept will be described clearly and in detail such that those skilled in the art may easily carry out the inventive concept.

Figure 1:
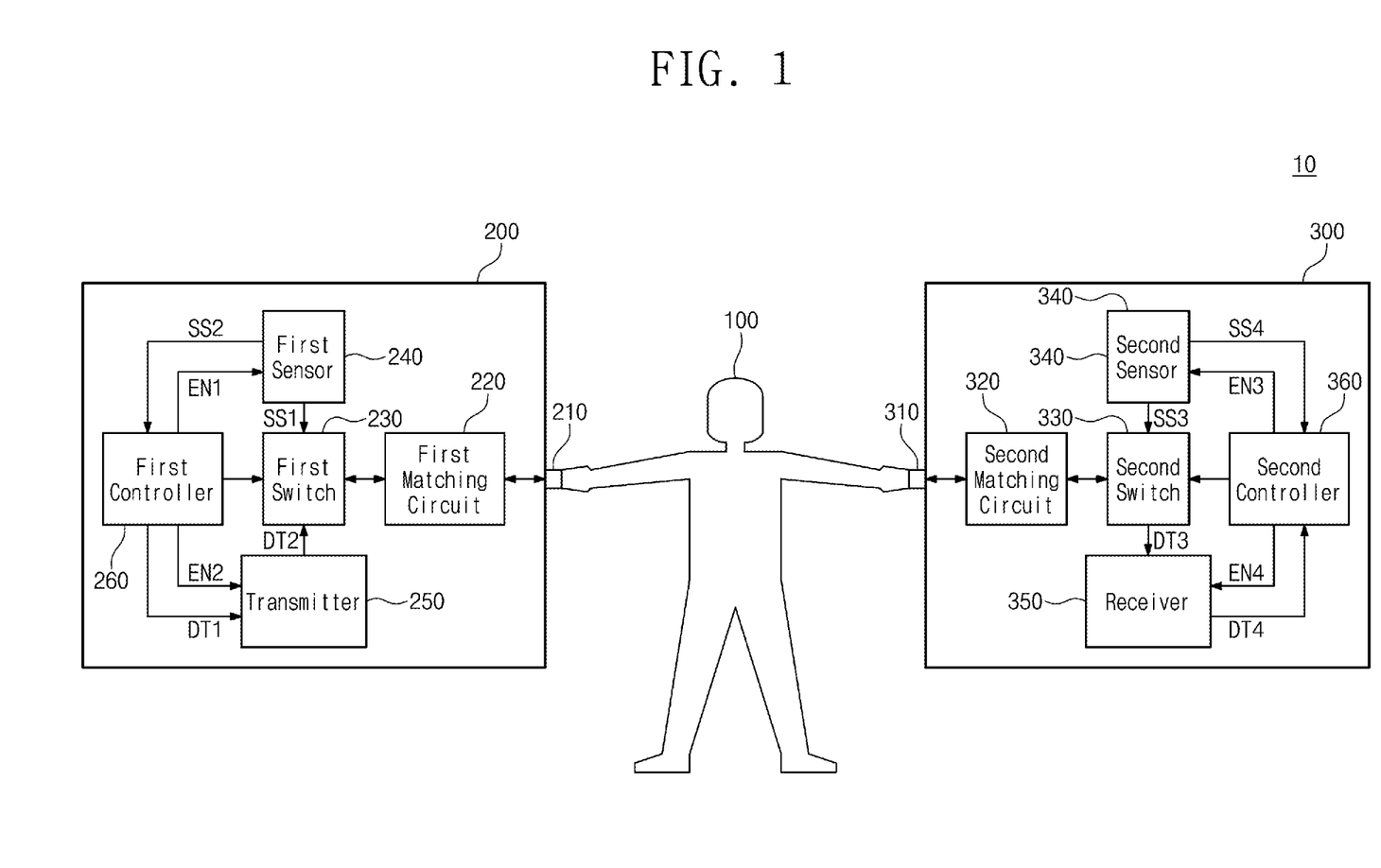
FIG. 1 is a block diagram illustrating a human body communication system according to a first embodiment of the inventive concept.

FIG. 1 is a block diagram illustrating a human body communication system 10 according to a first embodiment of the inventive concept. Referring to FIG. 1, the human body communication system 10 may include a human body 100, a first human body communication device 200, and a second human body communication device 300. The human body 100 may be a medium for communication between the first human body communication device 200 and the second human body communication device 300.

The first human body communication device 200 may include a first electrode 210, a first matching circuit 220, a first switch 230, a first sensor 240, a transmitter 250, and a first controller 260. The first electrode 210 may be exposed to an outside of the first human body communication device 200 and may contact the human body 100. The first electrode 210 may be a single electrode that enables human body communication of the first human body communication device 200.

The first matching circuit 220 may be connected to the first electrode 210. The first matching circuit 220 may provide impedance matching for the human body 100. The first matching circuit 220 may include passive elements such as a resistor, a capacitor, and an inductor. The first matching circuit 220 may include a variable resistor, a variable capacitor, or a variable inductor. Each of the variable resistor, the variable capacitor, or the variable inductor may be implemented by combining switches and passive elements. For example, the switches may operate in response to control of the first controller 260.

The first switch 230 may be connected to the first matching circuit 220. The first switch 230 may operate in response to the control of the first controller 260. The first switch 230 may select one of the first sensor 240 and the transmitter 250, and electrically connect the selected component to the first matching circuit 220.

For example, the first switch 230 may electrically connect the first sensor 240 to the first matching circuit 220 in a first state. The first state may be a sensing state. The first switch 230 may electrically connect the transmitter 250 to the first matching circuit 220 in a second state. The second state may be a communication state.

The first sensor 240 may operate in response to the control of the first controller 260. The first sensor 240 may receive a first active signal EN1 from the first controller 260. In the first state (i.e., the sensing state), the first active signal EN1 may be in an active state (e.g., a voltage of a first level), in the second state (i.e., the communication state), the first active signal EN1 may be in an inactive state (e.g., a voltage of a second level).

The first sensor 240 may enter an active mode in response to that the first active signal EN1 becomes the active state. The first sensor 240 may enter a power saving mode in response to that the first active signal EN1 becomes the inactive state.

For example, when the first switch 230 enters the first state (i.e., the sensing state) by the first controller 260, the first active signal EN1 becomes the active state, and the first sensor 240 may be in the active mode. In the active mode, the first sensor 240 may output a first sensing signal SS1 to the first electrode 210 through the first switch 230 and the first matching circuit 220. The first sensing signal SS1 may include a signal having a repeating pattern such as a continuous wave or a square wave.

In the active mode, the first sensor 240 may determine whether the first electrode 210 contacts the human body 100 in response to a change in the first sensing signal SS1. For example, the first sensor 240 may track an envelope of the first sensing signal SS1 generated from the first matching circuit 220, and may determine whether the first electrode 210 is in contact with the human body 100 in response to the change of the envelope.

When a magnitude of the envelope of the first sensing signal SS1 is greater (or less) than a specific threshold, the first sensor 240 may determine that the first electrode 210 is not in contact with the human body 100. When the magnitude of the envelope of the first sensing signal SS1 is less (or greater) than the specific threshold, the first sensor 240 may determine that the first electrode 210 is in contact with the human body 100.

When it is determined that the first electrode 210 is not in contact with the human body 100, the first sensor 240 may control a second sensing signal SS2 output to the first controller 260 to be the inactive state (e.g., a voltage of a third level). When it is determined that the first electrode 210 is in contact with the human body 100, the first sensor 240 may control the second sensing signal SS2 output to the first controller 260 to be the active state (e.g., a voltage of a fourth level different from the third level).

When the first switch 230 enters the second state (i.e., the communication state) by the first controller 260, the first active signal EN1 may be controlled to be the inactive state (e.g., a voltage of the second level different from the first level). As the first active signal EN1 becomes the inactive state, the first sensor 240 may enter the power saving mode.

In the power saving mode, the first sensor 240 may consume less power than a power consumed in the sensing mode. For example, in the power saving mode, the first sensor 240 may sense that the first active signal EN1 is controlled to be the active state, and may cut off a power supplied to other components except for components for entering the first state (the sensing state). The other components may be, for example, components for generating the first sensing signal SS1, determining a contact with the human body 100, and generating the second sensing signal SS2.

The transmitter 250 may operate in response to the control of the first controller 260. The transmitter 250 may receive a second active signal EN2 from the first controller 260. In the second state (i.e., the communication state), the second active signal EN2 may be in the active state (e.g., a voltage of a fifth level), in the first state (i.e., the sensing state), the second active signal EN2 may be in the inactive state (e.g., a voltage of a sixth level).

The transmitter 250 may enter the active mode in response to that the second active signal EN2 becomes the active state. The transmitter 250 may enter the power saving mode in response to that the second active signal EN2 becomes the inactive state.

In the active mode, the transmitter 250 may receive a first data signal DT1 from the first controller 260. The transmitter 250 may modulate the first data signal DT1 into a form suitable for human body communication to generate a second data signal DT2. The transmitter 250 may output the second data signal DT2 to the first electrode 210 through the first switch 230 and the first matching circuit 220.

For example, the first data signal DT1 may include fixed information. When the first switch 230 enters the second state (i.e., the communication state), and whenever the second active signal EN2 becomes the active state, the transmitter 250 may be configured to output the second data signal DT2 that includes the fixed information. For example, the transmitter 250 may be configured to generate the first data signal DT1 by itself instead of receiving the first data signal DT1 from the first controller 260. For example, the transmitter 250 may include storage that stores information for generating the first data signal DT1.

Exemplarily, in response to entering the active mode, the transmitter 250 may be configured to repeatedly transmit the second data signal DT2 more than twice. For example, when the first human body communication devices 200 are provided in two or more in the human body communication system 10, different first human body communication devices may respectively transmit different information.

After the transmitter 250 completes transmission of the second data signal DT2, under the control of the first controller 260, the first switch 230 enters the first state (i.e., the sensing state), and the transmitter 250 may enter the power saving mode. In the power saving mode, the transmitter 250 may consume less power than the power consumed in the active mode.

The first controller 260 may control operations of the first human body communication device 200. The first controller 260 may enter the second state (the communication state) in response to contacting of between the human body 100 and the first electrode 210 in the first state (the sensing state) to output the second data signal DT2, and may control the first human body communication device 200 to return to the first state (the sensing state).

The second human body communication device 300 may include a second electrode 310, a second matching circuit 320, a second switch 330, a second sensor 340, a receiver 350, and a second controller 360. The second electrode 310 may be exposed to an outside of the second human body communication device 300 to contact the human body 100. The second electrode 310 may be a single electrode that enables the human body communication of the second human body communication device 300.

The second matching circuit 320 may provide the impedance matching. The second matching circuit 320 may be configured in the same manner as the first matching circuit 220 described above, and may operate in the same manner as the first matching circuit 220.

The second switch 330 may be connected to the second matching circuit 320. The second switch 330 may operate in response to control of the second controller 360. The second switch 330 may select one of the second sensor 340 and the receiver 350, and may electrically connect the selected component to the second matching circuit 320.

For example, the second switch 330 may electrically connect the second sensor 340 to the second matching circuit 320 in the first state (i.e., the sensing state). The second switch 330 may electrically connect the receiver 350 to the second matching circuit 320 in the second state (i.e., the communication state). The second state may be the communication state.

The second sensor 340 may receive a third active signal EN3 from the second controller 360. In the first state (i.e., the sensing state), the third active signal EN3 may be in the active state (e.g., the voltage of the first level), and in the second state (i.e., the communication state), the third active signal EN3 may be in the inactive state (e.g., the voltage of the second level).

In response to that the third active signal EN3 becomes the active state, the second sensor 340 may enter the active mode. In response to that the third active signal EN3 becomes the inactive signal, the second sensor 340 may enter the power saving mode.

In the first state (i.e., the sensing state), the third active signal EN3 may be in the active state. That is, in the first state (i.e., the sensing state), the second sensor 340 may enter the active mode. In the second state (i.e., the communication state), the third active signal EN3 may be in the inactive state. That is, in the second state (i.e., the communication state), the second sensor 340 may enter the power saving mode.

In the first state (i.e., the sensing state), the second sensor 340 may output a third sensing signal SS3 to the second electrode 310 through the second switch 330 and the second matching circuit 320. As described with reference to the first sensor 240, when the human body 100 is in contact with the second electrode 310, the second sensor 340 may adjust a fourth sensing signal SS4 to be in the active state (e.g., the voltage of the fourth level) from the inactive state (e.g., the voltage of the third level). The fourth sensing signal SS4 may be transferred to the second controller 360.

The receiver 350 may receive a fourth active signal EN4 from the second controller 360. In the second state (i.e., the communication state), the fourth active signal EN4 may be in the active state (e.g., the voltage of the fifth level), and in the first state (i.e., the sensing state), the fourth active signal EN4 may be in the inactive state (e.g., the voltage of the sixth level).

In response to that the fourth active signal EN4 becomes the active state, the receiver 350 may enter the active mode. In response to that the fourth active signal EN4 becomes the inactive state, the receiver 350 may enter the power saving mode.

In the second state (i.e., the communication state), the fourth active signal EN4 may be in the active state. That is, in the second state (i.e., the communication state), the receiver 350 may enter the active mode. In the first state (i.e., the sensing state), the fourth active signal EN4 may be in the inactive state. That is, in the first state (i.e., the sensing state), the receiver 350 may enter the power saving mode.

In the second state (i.e., the communication state), the receiver 350 may receive a third data signal DT3 from the second electrode 310 through the second switch 330 and the second matching circuit 320. The receiver 350 may demodulate the third data signal DT3 to generate a fourth data signal DT4. The fourth data signal DT4 may be output to the second controller 360 or may be provided to a user through an interface device that is configured to provide information to the user, such as a display device or a speaker.

When an idle time at which the third data signal DT3 (or the fourth data signal DT4) is not received in the receiver 350 is longer than a first threshold time, under the control of the second controller 360, the second switch 330 may enter the first state (i.e., the sensing state), and the receiver 350 may enter the power saving mode. In the power saving mode, the receiver 350 may consume less power than the power consumed in the active mode.

The second controller 360 may control operations of the second human body communication device 300. The second controller 360 may enter the second state (the communication state) to generate the fourth data signal DT4, in response to contacting of between the human body 100 and the second electrode 310 in the first state (the sensing state). When the idle time is longer than the first threshold time, the second controller 360 may control the second human body communication device 300 to return to the first state (the sensing state).

Figure 2:
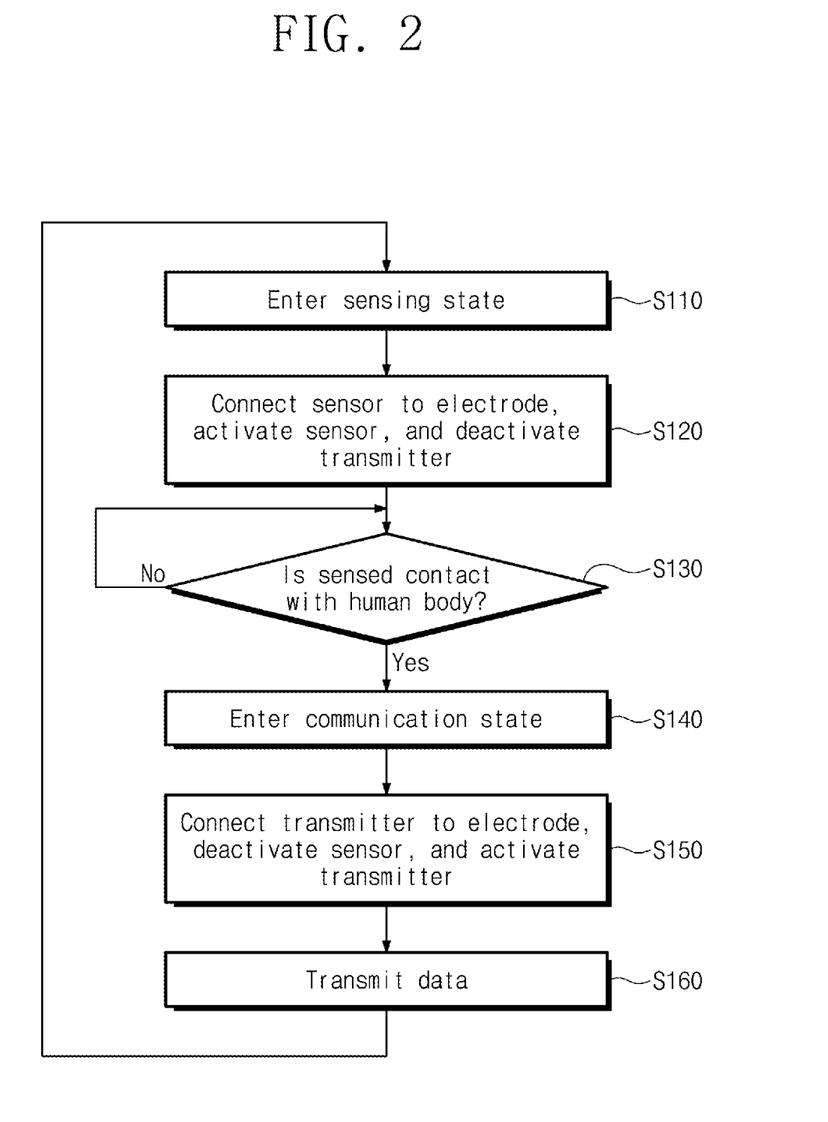
FIG. 2 is a flowchart describing a method of operating a first human body communication device of FIG. 1.

FIG. 2 is a flowchart describing a method of operating the first human body communication device 200 of FIG. 1. Referring to FIGS. 1 and 2, in operation S110, the first human body communication device 200 may enter the first state (the sensing state). In response to entering the first state (the sensing state), in operation S120, the first human body communication device 200 may electrically connect the first sensor 240 to the first electrode 210, may activate the first sensor 240 into the active mode, and may deactivate the transmitter 250 to be the power saving mode.

In operation S130, the first human body communication device 200 may determine whether a contact with the human body 100 is sensed from the first electrode 210. For example, the first sensor 240 may determine whether the contact with the human body 100 is sensed, based on the envelope of the first sensing signal SS1 that is sensed by the first sensor 240.

When the contact with the human body 100 is not sensed, the first human body communication device 200 may maintain the sensing state. When the contact with the human body 100 is sensed, in operation S140, the first human body communication device 200 may enter the second state (the communication state). In response to entering the second state (the communication state), in operation S150, the first human body communication device 200 may electrically connect the transmitter 250 to the first electrode 210, may deactivate the first sensor 240 to be the power saving mode, and may activate the transmitter 250 into the active mode.

In operation S160, the first human body communication device 200 may output the second data signal DT2 to the first electrode 210. When transmission of data is completed, in operation S110, the first human body communication device 200 may re-enter the first state (the sensing state).

That is, in response to sensing the contact with the human body 100 in the first state (the sensing state), the first human body communication device 200 may be configured to enter the second state (the communication state) to transmit the second data signal DT2, and to return to the first state (the sensing state).

For example, the first sensor 240 may perform sensing using the first sensing signal SS1 having a frequency different from the frequency of the transmitter 250. To improve a quality of communication, the first matching circuit 220 may be configured to provide the impedance matching to the transmitter 250. The first sensor 240 uses the first sensing signal SS1 having the frequency lower than the frequency of the transmitter 250, thereby reducing (or minimizing) influence of the first matching circuit 220 on the first sensor 240.

Figure 3:
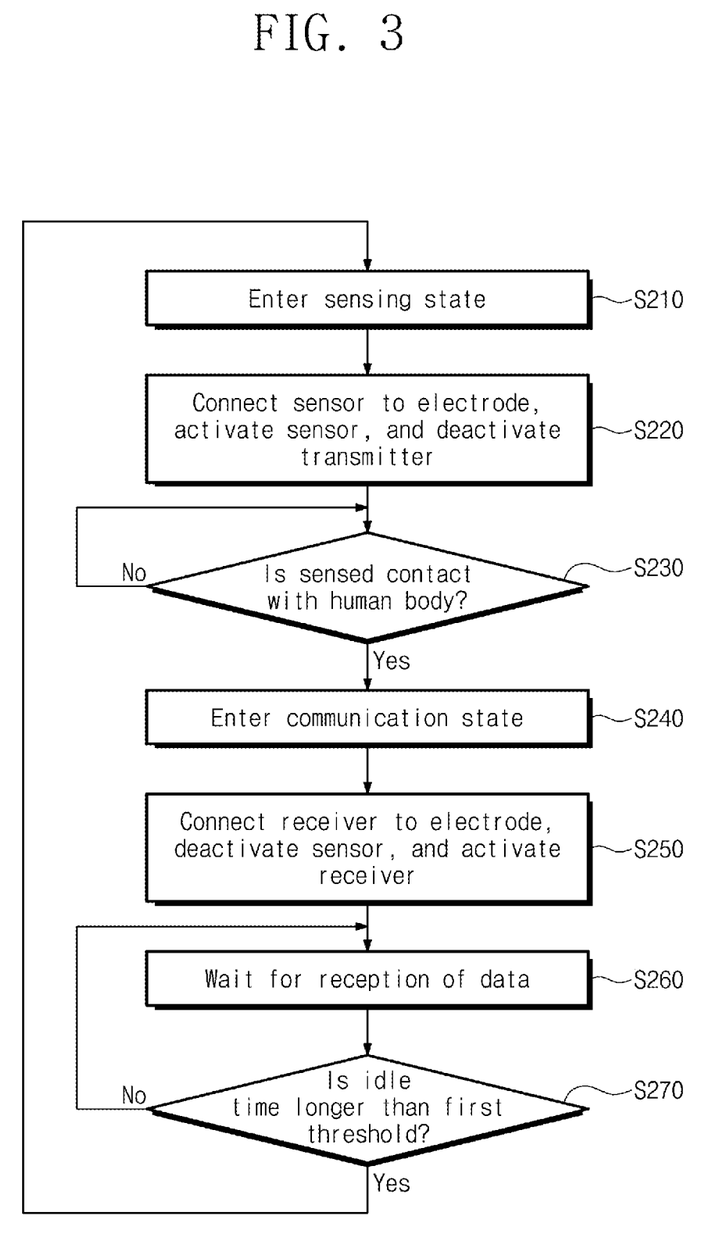
FIG. 3 is a flowchart describing a method of operating a second human body communication device of FIG. 1.

FIG. 3 is a flowchart describing a method of operating the second human body communication device 300 of FIG. 1. Referring to FIGS. 1 and 3, except that the components of the first human body communication device 200 are replaced by the corresponding components of the second human body communication device 300, operations S210 to S240 are performed in the same manner as operations S110 to S140 of FIG. 2. Accordingly, additional descriptions will be omitted to avoid redundancy.

In response to entering the second state (the communication state), in operation S250, the second human body communication device 300 may electrically connect the receiver 350 to the second electrode 310, may deactivate the second sensor 340 to be the power saving mode, and may activate the receiver 350 into the active mode.

In operation S260, the second human body communication device 300 may wait for the reception of the fourth data signal DT4. In operation S270, the second human body communication device 300 may determine whether the idle time at which the fourth data signal DT4 (or the third data signal DT3) is not received is longer than the first threshold time. When the idle time is longer than the first threshold time, in operation S210, the second human body communication device 300 may re-enter the first state (the sensing state).

That is, in response to sensing the contact with the human body 100 in the first state (the sensing state), the second human body communication device 300 may enter the second state (the communication state) to wait for the reception of the fourth data signal DT4, and when the idle time is longer than the first threshold time, may return to the first state (the sensing state).

When the fourth data signal DT4 is not continuously received while the second human body communication device 300 is in contact with the human body 100, the second human body communication device 300 may periodically transition between the first state (the sensing state) and the second state (the communication state).

For example, the second sensor 340 may perform sensing using the third sensing signal SS3 having a frequency different from the frequency of the receiver 350. To improve the quality of the communication, the second matching circuit 320 may be configured to provide the impedance matching to the receiver 350. The second sensor 340 uses the third sensing signal SS3 having the frequency lower than the frequency of the receiver 350, thereby reducing (or minimizing) the influence of the second matching circuit 320 on the second sensor 340.

Figure 4:
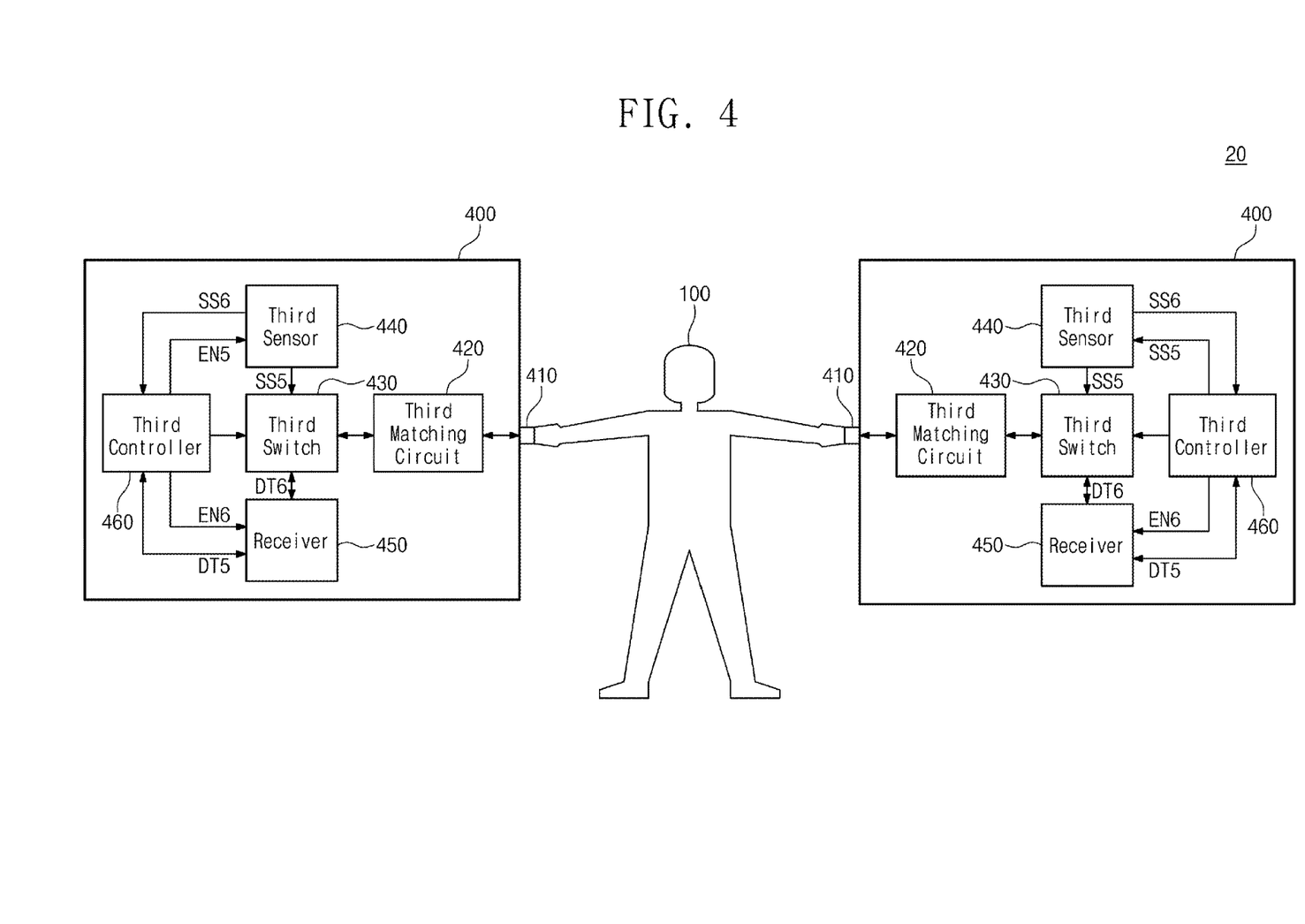
FIG. 4 is a block diagram illustrating a human body communication system according to a second embodiment of the inventive concept.

FIG. 4 is a block diagram illustrating a human body communication system 20 according to a second embodiment of the inventive concept. Referring to FIG. 4, the human body communication system 20 may include the human body 100 and third human body communication devices 400. The human body 100 may be a medium for communication of between the third human body communication devices 400. Unlike the first human body communication device 200 and the second human body communication device 300 of FIG. 1, the third human body communication devices 400 may perform bi-directional communication including transmission and reception.

Each of the third human body communication devices 400 may include a third electrode 410, a third matching circuit 420, a third switch 430, a third sensor 440, a transceiver 450, and a third controller 460. The third electrode 410 may be exposed to the outside of each of the third human body communication devices 400 to contact the human body 100. The third electrode 410 may be a single electrode that enables each human body communication of the third human body communication devices 400.

The third matching circuit 420 may provide the impedance matching. The third matching circuit 420 is configured in the same manner as the first matching circuit 220 described above, and may operate in the same manner as the first matching circuit 220.

The third switch 430 may be connected to the third matching circuit 420. The third switch 430 may operate in response to the control of the third controller 460. The third switch 430 may select one of the third sensor 440 and the transceiver 450 and may electrically connect the selected component to the third matching circuit 420.

For example, the third switch 430 may electrically connect the third sensor 440 to the third matching circuit 420 in the first state (i.e., the sensing state). The third switch 430 may electrically connect the transceiver 450 to the third matching circuit 420 in the second state (i.e., the communication state). The second state may be the communication state.

The third sensor 440 may receive a fifth active signal EN5 from the third controller 460. In the first state (i.e., the sensing state), the fifth active signal EN5 may be in the active state (e.g., the voltage of the first level), and in the second state (i.e., the communication state), the fifth active signal EN5 may be in the inactive state (e.g., the voltage of the second level).

In response to that the fifth active signal EN5 becomes the active state, the third sensor 440 may enter the active mode. In response to that the fifth active signal EN5 becomes the inactive state, the third sensor 440 may enter the power saving mode.

In the first state (i.e., the sensing state), the fifth active signal EN5 may be in the active state. That is, in the first state (i.e., the sensing state), the third sensor 440 may enter the active mode. In the second state (i.e., the communication state), the fifth active signal EN5 may be in inactive state. That is, in the second state (i.e., the communication state), the third sensor 440 may enter the power saving mode.

In the first state (i.e., the sensing state), the third sensor 440 may output a fifth sensing signal SS5 to the third electrode 410 through the third switch 430 and the third matching circuit 420. As described with reference to the first sensor 240, when the human body 100 contacts the third electrode 410, the third sensor 440 may adjust a sixth sensing signal SS6 to be the active state (e.g., the voltage of the fourth level) from the inactive state (e.g., the voltage of the third level). The sixth sensing signal SS6 may be transferred to the third controller 460.

The transceiver 450 may receive a sixth active signal EN6 from the third controller 460. In the second state (i.e., the communication state), the sixth active signal EN6 may be in the active state (e.g., the voltage of the fifth level), and in the first state (i.e., the sensing state), the sixth active signal EN6 may be in the inactive state (e.g., the voltage of the sixth level).

In response to that the sixth active signal EN6 becomes the active state, the transceiver 450 may enter the active mode. In response to that the sixth active signal EN6 becomes the inactive state, the transceiver 450 may enter the power saving mode.

In the second state (i.e., the communication state), the sixth active signal EN6 may be in the active state. That is, in the second state (i.e., the communication state), the transceiver 450 may enter the active mode. In the first state (i.e., the sensing state), the sixth active signal EN6 may be in the inactive state. That is, in the first state (i.e., the sensing state), the transceiver 450 may enter the power saving mode.

In the second state (i.e., the communication state), the transceiver 450 may perform transmission and reception. Upon transmission, the transceiver 450 may receive a fifth data signal DT5 from the third controller 460. The transceiver 450 may demodulate the fifth data signal DT5 to generate a sixth data signal DT6. The transceiver 450 may output the sixth data signal DT6 to the third electrode 410 through the third switch 430 and the third matching circuit 420.

Upon reception, the transceiver 450 may receive the sixth data signal DT6 from the third electrode 410 through the third switch 430 and the third matching circuit 420. The transceiver 450 may demodulate the sixth data signal DT6 to generate the fifth data signal DT5. The fifth data signal DT5 may be output to the third controller 460 or may be provided to the user through an interface device that is configured to provide information to the user, such as a display device or a speaker.

When the idle time at which the sixth data signal DT6 (or the fifth data signal DT5) is not transmitted or not received in the transceiver 450 is longer than a second threshold time, under the control of the third controller 460, the third switch 430 may enter the first state (i.e., the sensing state), and the transceiver 450 may enter the power saving mode. In the power saving mode, the transceiver 450 may consume less power than the power consumed in the active mode.

The third controller 460 may control respective operations of the third human body communication devices 400. The third controller 460 may enter the second state (the communication state) in response to contacting of between the human body 100 and the third electrode 410 in the first state (the sensing state), may perform transmission or reception, and when the idle time is longer than the second threshold time, may control each of the third human body communication devices 400 to return to the first state (the sensing state).

Figure 5:
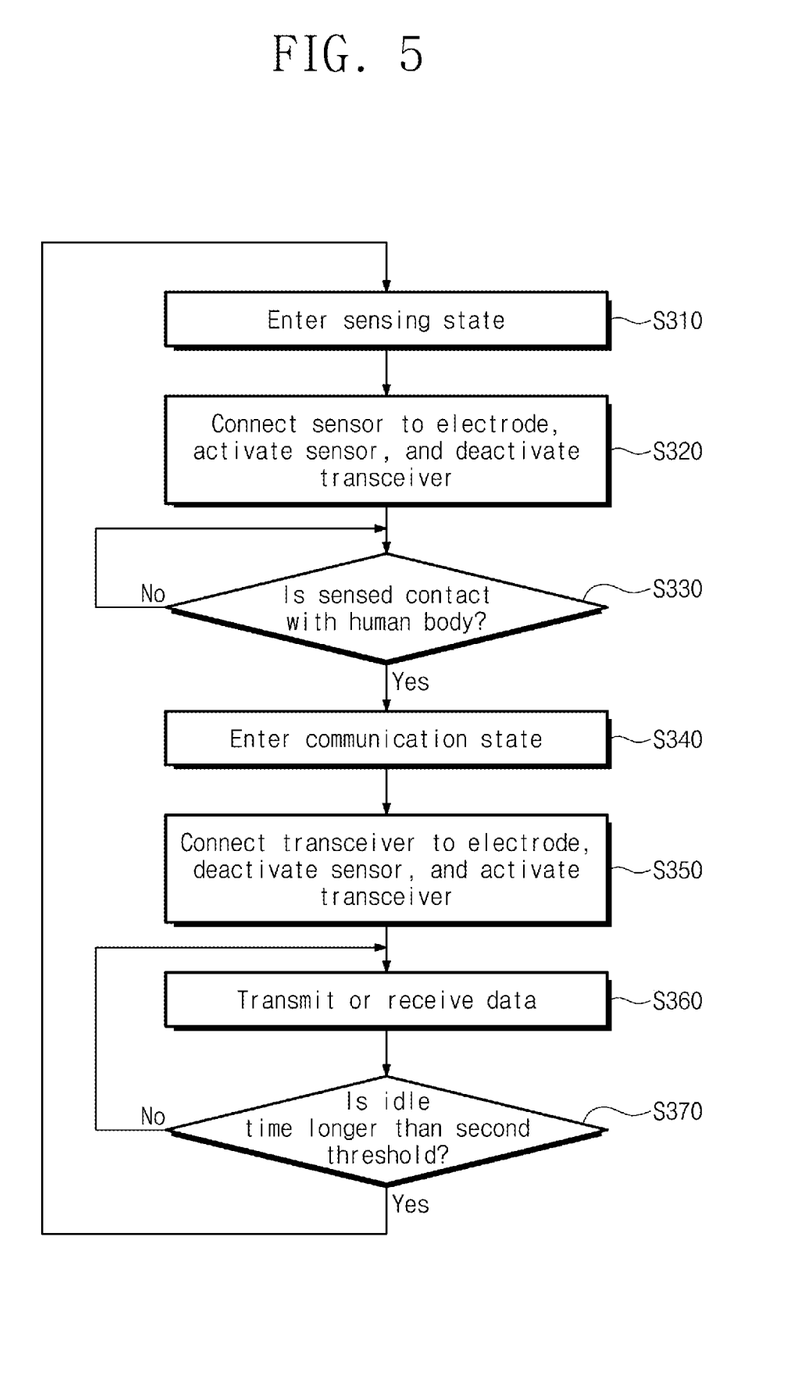
FIG. 5 is a flowchart describing a method of operating third human body communication devices of FIG. 4.

FIG. 5 is a flowchart describing a method of operating the third human body communication devices 400 of FIG. 4. Referring to FIGS. 4 and 5, except that the components of the first human body communication device 200 are replaced with corresponding components of the third human body communication devices 400, operations S310 to S340 are performed in the same manner as operations S110 to S140 of FIG. 2. Accordingly, additional descriptions will be omitted to avoid redundancy.

In response to entering the second state (the communication state), in operation S350, the third human body communication devices 400 may electrically connect the transceiver 450 to the third electrode 410, may deactivate the third sensor 440 to be the power saving mode, and may activate the transceiver 450 into the active mode.

In operation S360, the third human body communication devices 400 may transmit or receive the sixth data signal DT6. In operation S370, the third human body communication devices 400 may determine whether the idle time at which the sixth data signal DT6 (or the fifth data signal DT5) is not transmitted or not received is longer than the second threshold time. When the idle time is longer than the second threshold time, in operation S310, the third human body communication devices 400 may re-enter the first state (the sensing state).

That is, in response to sensing the contact with the human body 100 in the first state (the sensing state), the third human body communication devices 400 may enter the second state (the communication state) to transmit or receive the sixth data signal DT6, and when the idle time is longer than the second threshold time, may return to the first state (the sensing state)).

When the sixth data signal DT6 (or the fifth data signal DT5) is not continuously transmitted or received while the third human body communication devices 400 are in contact with the human body 100, the third human body communication devices 400 may periodically transition between the first state (the sensing state) and the second state (the communication state).

For example, the third sensor 440 may perform sensing using a fifth sensing signal SS5 having a frequency different from the frequency of the transceiver 450. To improve the quality of communication, the third matching circuit 420 may be configured to provide the impedance matching to the transceiver 450. The third sensor 440 uses the fifth sensing signal SS5 having the frequency lower than that of the transceiver 450, thereby reducing (or minimizing) the influence of the third matching circuit 420 on the third sensor 440.

In the above-described embodiments, components according to the inventive concept are described using terms such as first, second, third, etc. However, terms such as first, second, and third are used to distinguish components from one another, and do not limit the inventive concept. For example, terms such as first, second, third, etc., do not imply numerical meaning in any order or in any form.

In the above-described embodiments, components according to embodiments of the inventive concept are illustrated using blocks. The blocks may be implemented as various hardware devices such as an Integrated Circuit (IC), an Application Specific IC (ASIC), a Field Programmable Gate Array (FPGA), and a Complex Programmable Logic Device (CPLD), a firmware running on hardware devices, software such as an application, or a combination of hardware devices and software. Further, the blocks may include circuits composed of semiconductor elements in the IC or circuits registered as IP (Intellectual Property).

According to the inventive concept, there is provided a human body communication device that senses contact of the human body device using a single electrode and performs human body communication using a single electrode when a human body contact is sensed using the single electrode. Accordingly, the human body communication device with improved user convenience may be provided. In addition, components for sensing and components for communication in the human body communication device alternately enter a power saving mode. Therefore, the human body communication device with reduced power consumption may be provided.

The contents described above are specific embodiments for implementing the inventive concept. The inventive concept will include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A human body communication device comprising:
   an electrode;
   a matching circuit connected to the electrode and configured to provide an impedance matching;
   a switch configured to provide a first path that is electrically connected to the matching circuit in a first state, and to provide a second path that is electrically connected to the matching circuit in a second state;
   a sensor, in the first state, connected to the matching circuit through the first path of the switch, configured to output a first sensing signal to the matching circuit through the switch, and configured to output a second sensing signal when a difference between a signal that is generated from the matching circuit in response to the first sensing signal and the first sensing signal is greater than or equal to a threshold;
   a transmitter, in the second state, connected to the matching circuit through the second path of the switch, and configured to output a data signal to the matching circuit through the switch; and
   a controller configured to control the switch from the first state to the second state in response to receiving the second sensing signal from the sensor, in the first state.

2. The human body communication device of claim 1, wherein, in the first state, the controller is further configured to control the sensor in an active mode and control the transmitter in a power saving mode.

3. The human body communication device of claim 1, wherein, in the second state, the controller is further configured to control the sensor in a power saving mode and control the transmitter in an active mode.

4. The human body communication device of claim 1, wherein the transmitter is further configured to output fixed information as the data signal in response to that the switch enters the second state from the first state.

5. The human body communication device of claim 1, wherein, in the second state, the controller is further configured to control the switch from the second state to the first state in response to that the transmitter completes an output of the data signal.

6. A human body communication device comprising:
   an electrode;
   a matching circuit connected to the electrode and configured to provide an impedance matching;
   a switch configured to provide a first path that is electrically connected to the matching circuit in a first state, and to provide a second path that is electrically connected to the matching circuit in a second state;
   a sensor, in the first state, connected to the matching circuit through the first path of the switch, configured to output a first sensing signal to the matching circuit through the switch, and configured to output a second sensing signal when a difference between a signal that is generated from the matching circuit in response to the first sensing signal and the first sensing signal is greater than or equal to a threshold;

a receiver, in the second state, connected to the matching circuit through the second path of the switch, and configured to receive a data signal from the matching circuit through the switch; and a controller configured to control the switch from the first state to the second state in response to receiving the second sensing signal from the sensor, in the first state.

7. The human body communication device of claim 6, wherein, in the first state, the controller is further configured to control the sensor in an active mode and control the receiver in a power saving mode.

8. The human body communication device of claim 6, wherein, in the second state, the controller is further configured to control the sensor in a power saving mode and control the receiver in an active mode.

9. The human body communication device of claim 6, wherein, in the second state, when an idle time for which the data signal is not received is longer than a threshold, the controller is further configured to control the switch from the second state to the first state.

10. A human body communication device comprising:
an electrode;
a matching circuit connected to the electrode and configured to provide an impedance matching;
a switch configured to provide a first path that is electrically connected to the matching circuit in a first state, and to provide a second path that is electrically connected to the matching circuit in a second state;
a sensor, in the first state, connected to the matching circuit through the first path of the switch, configured to output a first sensing signal to the matching circuit through the switch, and configured to output a second sensing signal when a difference between a signal that is generated from the matching circuit in response to the first sensing signal and the first sensing signal is greater than or equal to a threshold;

a transceiver, in the second state, connected to the matching circuit through the second path of the switch, and configured to output a first data signal to the matching circuit through the switch or to receive a second data signal from the matching circuit; and a controller configured to control the switch from the first state to the second state in response to receiving the second sensing signal from the sensor, in the first state.

11. The human body communication device of claim 10, wherein, in the first state, the controller is further configured to control the sensor in an active mode and control the transceiver in a power saving mode.

12. The human body communication device of claim 10, wherein, in the second state, the controller is further configured to control the sensor in a power saving mode and control the transceiver in an active mode.

13. The human body communication device of claim 10, wherein, in the second state, when an idle time for which the first data signal is not output and the second data signal is not received is longer than a threshold, the controller is further configured to control the switch from the second state to the first state.

* * * * *